United States Patent [19]

Hanke

[11] 4,257,504
[45] Mar. 24, 1981

[54] HYDRODYNAMIC RETARDER FOR VEHICLES, ESPECIALLY FOR MOTOR VEHICLES

[75] Inventor: Hans Hanke, Stuttgart, Fed. Rep. of Germany

[73] Assignee: Daimler-Benz Aktiengesellschaft, Stuttgart, Fed. Rep. of Germany

[21] Appl. No.: 884,567

[22] Filed: Mar. 8, 1978

[30] Foreign Application Priority Data

Mar. 12, 1977 [DE] Fed. Rep. of Germany ....... 2710870

[51] Int. Cl.³ .................................................. F16D 67/04
[52] U.S. Cl. .................................................. 192/12 A
[58] Field of Search ............. 188/296, 290; 192/12 A, 192/4 B, 3.34, 4 A, 4 R, 13 A; 60/357, 358, 359, 360

[56] References Cited

U.S. PATENT DOCUMENTS

| | | | |
|---|---|---|---|
| 2,750,009 | 6/1956 | Pohl | 60/357 |
| 3,302,755 | 2/1967 | Botterill et al. | 188/296 |
| 3,512,616 | 5/1970 | Bessiere | 60/357 |
| 3,572,480 | 3/1971 | Nagel | 188/296 |
| 3,774,734 | 11/1973 | Forster et al. | 188/296 |
| 3,774,735 | 11/1973 | Hanke et al. | 188/296 |
| 3,823,986 | 7/1974 | Pollinger et al. | 188/296 |
| 3,931,870 | 1/1976 | Memmer | 188/296 |
| 3,941,224 | 3/1976 | Hanke | 192/12 A |
| 4,004,660 | 1/1977 | Shore et al. | 188/296 |

FOREIGN PATENT DOCUMENTS 1380847   1/1975   United Kingdom ..................... 188/296

*Primary Examiner*—George H. Krizmanich
*Attorney, Agent, or Firm*—Craig & Antonelli

[57] ABSTRACT

A hydrodynamic retarder for vehicles with an internal working circulation within a working space between at least one rotating and one fixed blade wheel and with an external cooling circulation, whereby the filling of the working circulation takes place from a filling cylinder actuated by a pressure medium, whose actuation is controllable by an actuating device such as a hand brake lever by means of a control valve; a relay valve is thereby arranged in the pressure medium inlet line which, in its turn, is controllable by the actuating device by means of the control valve.

13 Claims, 1 Drawing Figure

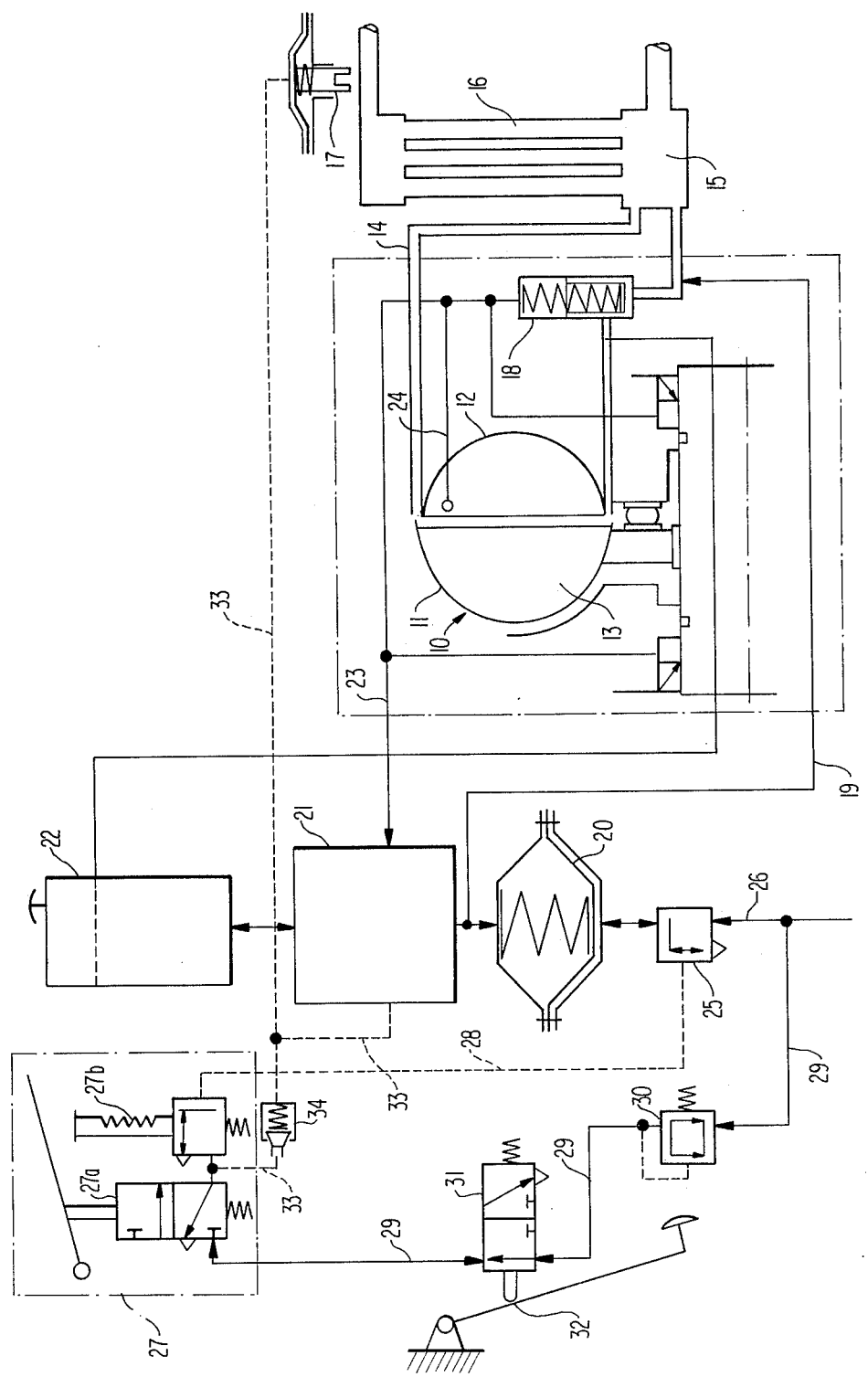

HYDRODYNAMIC RETARDER FOR VEHICLES, ESPECIALLY FOR MOTOR VEHICLES

The present invention relates to a hydrodynamic retarder for vehicles, especially for motor vehicles, with an internal working circulation within a working space between at least one rotating and at least one fixed blade wheel and with an external cooling circulation, whereby the filling of the working circulation takes place from a filling cylinder actuated by pressure medium, whose actuation is controllable by an actuating device, such as a manual brake lever, by means of a control valve.

A hydrodynamic retarder more or less constructed in this manner, is disclosed in the German Offenlegungsschrift No. 21 02 078 of the assignee of the present application. In this prior art retarder, the filling cylinder is actuated by way of a brake valve directly from the pressure medium supply of the vehicle. The present invention is now concerned with the task to further improve this arrangement. In particular, shorter response periods are to be achieved, the control valves are to be simplified in their type of construction and the space is to be economized.

The underlying problems are solved according to the present invention with the retarders of the aforementioned type in that a relay valve is arranged in the pressure medium inlet line to the filling cylinder which, in its turn, is controllable by the actuating device by means of the control valve.

This construction according to the present invention offers the advantage that all lines and control devices in the control circuit can be constructed with considerably smaller cross sections. As a result of the smaller masses, this produces considerably shorter engaging and disengaging periods of time. Additionally, the corresponding devices can be constructed as such smaller so that a lesser space requirement will result therefrom.

A preferred embodiment of the present invention is characterized in that the pressure medium inlet line includes a first branch to the relay valve and a second branch to the control valve while the second branch is conducted by way of a pressure limiter. As a result thereof, it is possible in an advantageous manner to determine by means of this pressure limiter the maximum filling pressure and therewith the maximum braking power for the retarder so that a retarder of the same size can be utilized with different pressure limiters in different types of vehicles.

Moreover, in a preferred embodiment of the present invention, a valve actuated directly by the clutch actuation of the vehicle is arranged between the control valve and the pressure limiter, which valve is open with an engaged clutch whereas it is closed with a disengaged clutch and in the latter position relieves the control valve to zero. As a result thereof, the retarder can be disengaged and engaged during a shifting operation so that an easier and also shorter shifting operation results.

Additionally, the present invention also proposes to combine a shifting valve and a regulating valve into a structural unit within the control valve and to branch-off upstream of the control valve a shifting line to a closure valve and to a thermostat switch while a check valve equipped with a return-flow throttle opening is arranged in the shifting line. The proposed closure valve acts in an advantageous manner as safety valve when exceeding a predetermined pressure in the retarder while the return throttle according to the present invention prevents a premature opening of the connection between the storage device and the supply tank with an unskilled or improper actuation.

Accordingly, it is an object of the present invention to provide a hydrodynamic retarder for vehicles, especially for motor vehicles, which avoids by simple means the aforementioned shortcomings and drawbacks encountered in the prior art.

Another object of the present invention resides in a hydrodynamic retarder for vehicles which is characterized by improved overall performance.

A further object of the present invention resides in a hydrodynamic retarder for vehicles, which offers shorter response periods, simplification of the control valve constructions and savings in space requirements.

Still a further object of the present invention resides in a hydrodynamic retarder for vehicles which enables the use of lines and control devices with considerably smaller cross sections to thereby reduce the masses thereof.

Another object of the present invention resides in a hydrodynamic retarder in which the maximum filling pressure and therewith the maximum brake power for the retarder can be determined by simple means.

A further object of the present invention resides in a hydrodynamic retarder for vehicles, especially for motor vehicles, which is so constructed and arranged that a retarder of the same size can be used in different types of vehicles by merely utilizing different pressure limiters.

Still another object of the present invention resides in a hydrodynamic retarder of the type described above which facilitates the shifting operation and also permits shorter shifting periods.

Another object of the present invention resides in a hydrodynamic retarder for vehicles which far-reachingly prevents improper operation notwithstanding unskilled or improper actuation thereof.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic diagram of a hydrodynamic retarder for vehicles in accordance with the present invention.

Referring now to the single FIGURE of the drawing, the retarder generally designated by reference numeral 10 includes an internal working circulation within a working space 13 formed by the rotor 11 and by the stator 12 and an external cooling circulation 14. The cooler or radiator 15 of the cooling circulatory system 14 is integrated in the radiator 16 of the vehicle engine. A thermostat switch 17 is coordinated to the radiator 16, which is so controlled by the retarder that is opened in every case when the retarder is engaged. A by-pass slide valve 18 is additionally arranged in the external cooling circulatory system 14.

The working space 13 of the retarder can be filled from a storage device 20 actuated by compressed air by way of a filling means comprised by the filling and discharge line 19 connected to the external cooling circulatory system 14. This storage device 20 is operatively connected with a reservoir or supply tank 22 by way of a closure valve 21 of conventional construction and therefore not described in detail herein. A lubricating line 23 is connected with the closure valve 21 which relieves the sealing spaces of the retarder 10 and maintains the lubrication at the seals. The lubricating line 23 is connected to the by-pass valve 18 and to the center of the working space 13 in the retarder 10 by means of a further line 24.

The compressed air actuation of the storage device 20 takes place by way of a relay means formed by a relay valve 25 which is fed from the compressed air reservoir of the vehicle by way of a first branch line 26. This first branch line 26 has a correspondingly large cross section. The control of the relay valve 25 takes place from a control valve 27 by way of a line 28. The compressed air is also supplied from the compressed air reservoir of the vehicle to the control valve 27 by way of a second branch line 29 of corresponding small cross section. A pressure limiter 30 and a shutoff valve in the form of a so-called clutch valve 31 are arranged in the second branch line 29. The clutch valve 31 is actuated by a control part participating in gear shifting operations, for example, the clutch pedal 32, in such a manner that with an engaged clutch, the clutch valve 31 is shifted to its through-passage position, i.e., is open, and with a disengaged clutch, it is closed. The control valve 27 is constructed as hand brake valve even though in principle also the construction as foot brake valve is feasible within the purview of the present invention. The control valve 27 consists of a shifting valve 27a and of a series-connected regulating valve 27b which may have, for example, three or four steps. A control line 33 is branched off from the control valve 27 intermediate the shifting valve 27a and the regulating valve 27b, by means of which the closure valve 21 and the thermostat valve 17 can be actuated by way of a return-flow throttle 34. The arrangement is thereby made in such a manner that initially the shifting valve 27a opens up the through-flow to the closure valve 21 and thereupon to the regulating valve 27b. As a result thereof, upon opening of the shifting valve 27a, closure valve 21 is closed immediately and the thermostat valve 17 is opened if it has not already been opened beforehand for temperature reasons. The regulating valve 27b then regulates the pressure to the aforementioned steps, which then actuates by way of the line 28 the relay valve 25 so that the storage device 20 can be acted upon with the respective step-wise adjusted pressure and therewith the corresponding filling pressure can be adjusted in the retarder 10. Since the return throttle of check valve 34 inherently forms a pressure control valve that delays the flow of fluid through shifting line 33 to the control valve 27, premature opening of the hydraulic connection between the storage device 20 and the supply tank 22 (i.e., closure valve 21) due to unskilled or improper actuation can be avoided.

With a disengaged retarder 10, the control valve 27 is closed so that the pressure out of the reservoir tank of the vehicle exists at the shifting valve 27a, on the one hand, and at the relay valve 25, on the other. The storage device 20 is connected with the reservoir tank 22 by way of the open closure valve 21 and lubricating oil flows out of the reservoir tank 22 into the lubricating line 23 by way of the closure valve 21.

If the control valve 27 is now actuated, for example, to the step 1, then the shifting valve 27a opens and the closure valve 21 is closed immediately by way of the line 33 and the thermostat valve 17 is opened. At the same time, the pressure corresponding to the step 1 is established at the regulating valve 27b, which opens the relay valve 25 to a corresponding extent. Consequently, the retarder 10 is filled with a corresponding pressure out of the storage device 20 by way of the filling and discharge line 19. The lubrication during the braking operation takes place by the lubricating oil escaping out of the piston rings being fed to the sealing rings and again fed out of the lubricating line 23 from the center of the working space 13 by way of the line 24. During idling lubrication takes place in a reverse manner.

The particular advantage of the present invention resides in the indirect control of the storage device 20, whereby all control devices can be constructed with considerably smaller cross sections and accordingly also with smaller masses. A more rapid control period and also smaller space requirements result therefrom since the respective devices are considerably smaller.

In order to be able to use the retarder in different types of vehicles, the maximum braking power has to be separately adjustable in addition for cooling and power reasons. This adjustability is additionally required also in order to compensate for the spread or range of distribution of the respective apparatus in one and the same type of vehicle. For this purpose, the pressure limiter 30 is provided in the second branch line 29. In the uppermost lever position at the control valve 27, the pressure regulating valve 27b is shifted to through-passage, i.e., is open, which means in this shifting position, the pressure adjusted at the pressure limiter 30 exists directly at the storage device 20 by way of the relay valve 25, as a result of which also the filling pressure in the retarder is determined. This filling pressure determines, however,—as known—the braking moment and the braking power.

If during the braking operation a speed in the change-speed transmission has to be changed by reason of a rotational speed adaptation to the driving velocity, then the retarder decelerates the unclutched engine at the crankshaft to idling rotational speed. A shifting is then possible only with difficulty by reason of the large rotational speed difference between engine and transmission. In order to prevent this, the clutch valve 31 disengages the retarder during actuation of the clutch pedal 32 and re-engages the same during release of the clutch pedal or re-engagement of the clutch. The shifting operation is facilitated in this manner.

In all of the described operation, the small dimensioning of the parts and lines in the control system according to the present invention is advantageous since all shifting operations can be considerably shortened in time.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A retarder for vehicles comprising an internal working circulation means within a working space means between at least one rotating blade wheel and at least one fixed blade wheel, an external cooling circulation means associated with said working space, means including a pressure medium actuated filling means having a pressure medium inlet line for filling the working circulation means, the actuation of said filling means being controllable by an actuating device by means of a control valve means associated therewith, a relay valve means being arranged in the pressure medium inlet line to the filling means which, in its turn, is controllable by the actuating device associated therewith by means of the control valve means, said pressure medium inlet line including a first branch to the relay valve means and a second branch to said control valve means, and a pressure limiter means being interconnected in the second branch, characterized in that a clutch valve means actuatable by the clutch actuation is arranged between the control valve means and the pressure limiter means, said clutch valve means being open with an engaged clutch and being closed with a disengaged clutch and in the latter position relieving the control valve means towards zero.

2. A retarder according to claim 1, characterized in that the actuating device is a hand brake lever.

3. A retarder according to claim 1, characterized in that the filling means is a filling cylinder.

4. A retarder according to claim 1, characterized in that the clutch valve means is actuated directly by the clutch actuation.

5. A retarder according to claim 1, characterized in that a shifting valve means and a regulating valve means are combined into a structural unit within the control valve means and in that a shifting line leading to a closure valve means and to a thermostat switch branches off upstream of the regulating valve means.

6. A retarder according to claim 5, characterized in that a check valve means provided with a return-flow throttle opening is arranged in the shifting line for preventing premature operation of said closure valve means.

7. A retarder comprising working circulation means within a working space means between at least one rotating blade wheel and at least one fixed blade wheel, an external cooling circulation means associated with said working space, means including a pressure medium actuated filling means having a pressure medium inlet line for filling the working circulation means, the actuation of said filling means being controllable by an actuating device by means of a control valve means associated therewith a relay valve means being arranged in the pressure medium inlet line to the filling means which, in its turn, is controllable by the actuating device associated therewith by means of the control valve means, characterized in that a shifting valve means and a regulating valve means are combined into a structural unit within the control valve means and in that a shifting line leading to a closure valve means and to a thermostat switch branches off upstream of the regulating valve means.

8. A retarder according to claim 7, characterized in that a check valve means provided with a return-flow throttle opening is arranged in the shifting line for preventing premature operation of said closure valve means.

9. Control device for a hydrodynamic retarder for vehicles having a manually shifted transmission of the type wherein an arbitrary operable retarder control valve sets a pneumatic charging pressure of a supply tank that is in communication with a working chamber of the retarder having at least one fixed and at least one rotating bucket wheel, comprising a shutoff valve operably acted upon by a control part participating in gear shifting operations, said shutoff valve cooperating with the retarder control valve in such a way that charging pressure is turned off during said gearshifting operations.

10. Control device according to claim 9, comprising an adjustable pressure limiting valve for varying the maximum value of the charging pressure.

11. Control device according to claim 9 or 10, comprising a closing valve associated with the retarder control valve so as to be operable thereby, said closing valve, during braking, blocking a hydraulic connection between the supply tank and a storage device for hydraulic operating medium and opening this connection when the retarder control valve is not in operation, and a pressure control valve being arranged in a control line leading to the closing valve.

12. Control device according to one of claims 9 or 10, characterized in that the retarder control valve is arranged for operating a thermostat switch for inserting a heat exchanger, passed through by the operating medium of the retarder, into a cooling system of an internal combustion engine.

13. Control device according to claim 11, characterized in that the retarder control valve is arranged for operating a thermostat switch for inserting a heat exchanger, passed through by the operating medium of the retarder, into a cooling system of an internal combustion engine.

* * * * *